United States Patent
Cucala Garcia (10) Patent No.: US 9,603,142 B2
(45) Date of Patent: Mar. 21, 2017

(54) METHOD FOR RADIO RESOURCES USAGE REPORTING IN A LTE NETWORK AND USES THEREOF FOR INTERFERENCE REDUCTION AND FOR ENERGY OPTIMIZATION

(71) Applicant: TELEFONICA, S.A., Madrid (ES)

(72) Inventor: Luis Cucala Garcia, Madrid (ES)

(73) Assignee: Telefonica, S.A., Madrid (ES)

( * ) Notice: Subject to any disclaimer, the term of this patent is extended or adjusted under 35 U.S.C. 154(b) by 133 days.

(21) Appl. No.: 14/405,664

(22) PCT Filed: Jun. 3, 2013

(86) PCT No.: PCT/EP2013/061350
§ 371 (c)(1),
(2) Date: Dec. 4, 2014

(87) PCT Pub. No.: WO2013/182507
PCT Pub. Date: Dec. 12, 2013

(65) Prior Publication Data
US 2015/0173069 A1    Jun. 18, 2015

(30) Foreign Application Priority Data
Jun. 5, 2012 (ES) .................................. 201230864

(51) Int. Cl.
*G01R 31/08* (2006.01)
*H04L 5/14* (2006.01)
(Continued)

(52) U.S. Cl.
CPC ... *H04W 72/0426* (2013.01); *H04W 52/0222* (2013.01); *H04W 72/1289* (2013.01); *H04W 52/02* (2013.01); *Y02B 60/50* (2013.01)

(58) Field of Classification Search
CPC ......... H04W 72/0426; H04W 52/0222; H04W 72/1289
See application file for complete search history.

(56) References Cited

U.S. PATENT DOCUMENTS

2008/0285477 A1* 11/2008 Kuroda ................. H04L 1/0026
                                                           370/252
2009/0059871 A1* 3/2009 Nader ................... H04W 36/30
                                                           370/337
(Continued)

FOREIGN PATENT DOCUMENTS

WO      2011/147450 A1    12/2011
WO      2012/070914 A2    5/2012

OTHER PUBLICATIONS

International Search Report for PCT/EP2013/061350 dated Mar. 13, 2014.
(Continued)

*Primary Examiner* — Faruk Hamza
*Assistant Examiner* — Abu-Sayeed Haque
(74) *Attorney, Agent, or Firm* — Sughrue Mion, PLLC (57) ABSTRACT

The method comprises a LTE cellular base station reporting radio resources usage information about its resource assignment in a current LTE frame emitted or to be emitted thereby, regarding slot usage for at least the slots of the downlink subframes of the current LTE frame, and generally also regarding the slots of subsequent downlink subframes and of also regarding uplink subframes. The uses of the method are for interference reduction and for energy optimization.

14 Claims, 3 Drawing Sheets

(51) Int. Cl.
　　　*H04B 7/00*　　　　(2006.01)
　　　*H04J 3/00*　　　　(2006.01)
　　　*H04W 72/04*　　　(2009.01)
　　　*H04W 72/12*　　　(2009.01)
　　　*H04W 52/02*　　　(2009.01)

(56) References Cited

U.S. PATENT DOCUMENTS

| | | | |
|---|---|---|---|
| 2010/0177649 A1* | 7/2010 | Ishii | H04L 1/1854 |
| | | | 370/252 |
| 2010/0195514 A1* | 8/2010 | Xu | H04B 7/0615 |
| | | | 370/252 |
| 2010/0195604 A1* | 8/2010 | Papasakellariou | H04L 1/1893 |
| | | | 370/329 |
| 2011/0085483 A1* | 4/2011 | Yeon | H04W 72/0413 |
| | | | 370/311 |
| 2012/0106465 A1* | 5/2012 | Haghighat | H04W 72/1289 |
| | | | 370/329 |
| 2012/0113844 A1 | 5/2012 | Krishnamurthy | |
| 2013/0083740 A1* | 4/2013 | Eriksson | H04L 1/1861 |
| | | | 370/329 |
| 2013/0195031 A1* | 8/2013 | Hessler | H04L 1/1819 |
| | | | 370/329 |
| 2013/0230013 A1 | 9/2013 | Seo et al. | |

OTHER PUBLICATIONS

Written Opinion for PCT/EP2013/061350 dated Mar. 13, 2014.
International Preliminary Report on Patentability for PCT/EP2013/061350 dated Jun. 17, 2014.

* cited by examiner

METHOD FOR RADIO RESOURCES USAGE REPORTING IN A LTE NETWORK AND USES THEREOF FOR INTERFERENCE REDUCTION AND FOR ENERGY OPTIMIZATION

CROSS REFERENCE TO RELATED APPLICATIONS

This application is a National Stage of International Application No. PCT/EP2013/061350 filed Jun. 3, 2013, claiming priority based on Spanish Patent Application No. P201230864 filed Jun. 5, 2012, the contents of all of which are incorporated herein by reference in their entirety.

Field of the Art

The present invention generally relates, in a first aspect, to a method for radio resources usage reporting in a LTE network, and more particularly to a method performing said radio resources usage reporting regarding slot usage of a LTE frame.

A second aspect of the invention refers to a use of the method of the first aspect for interference reduction.

A third aspect of the invention refers to a use of the method of the first aspect for energy optimization.

Prior State of the Art

This present invention is related with the Long Term Evolution (LTE) radio standard, as it is standardized by the 3 GPP consortium, and the implementation of its Physical Layer and Radio Resource Management (RRM) procedures.

3 GPP TS 36.211 [1] describes the LTE frame structure. There are two types of frame structures, type 1 (for Frequency Division Multiplexing or FDD) and type 2 (for Time Division Multiplexing or TDD).

Frame structure type 1 is applicable to both full duplex and half duplex FDD. Each radio frame is 10 ms long and consists of 20 slots of length 0.5 ms, numbered from 0 to 19. A subframe is defined as two consecutive slots.

Figure 1:
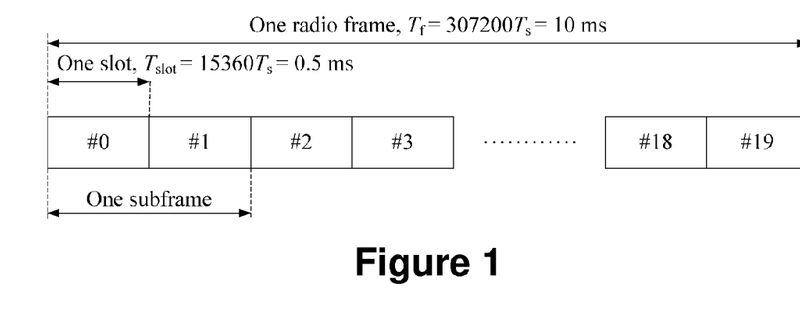
FIG. 1 is a LTE type 1 frame structure.

For FDD, 10 subframes are available for downlink transmission and 10 subframes are available for uplink transmissions in each 10 ms interval. Uplink and downlink transmissions are separated in the frequency domain. FIG. 1 is a scheme of the type 1 frame structure.

Figure 2:
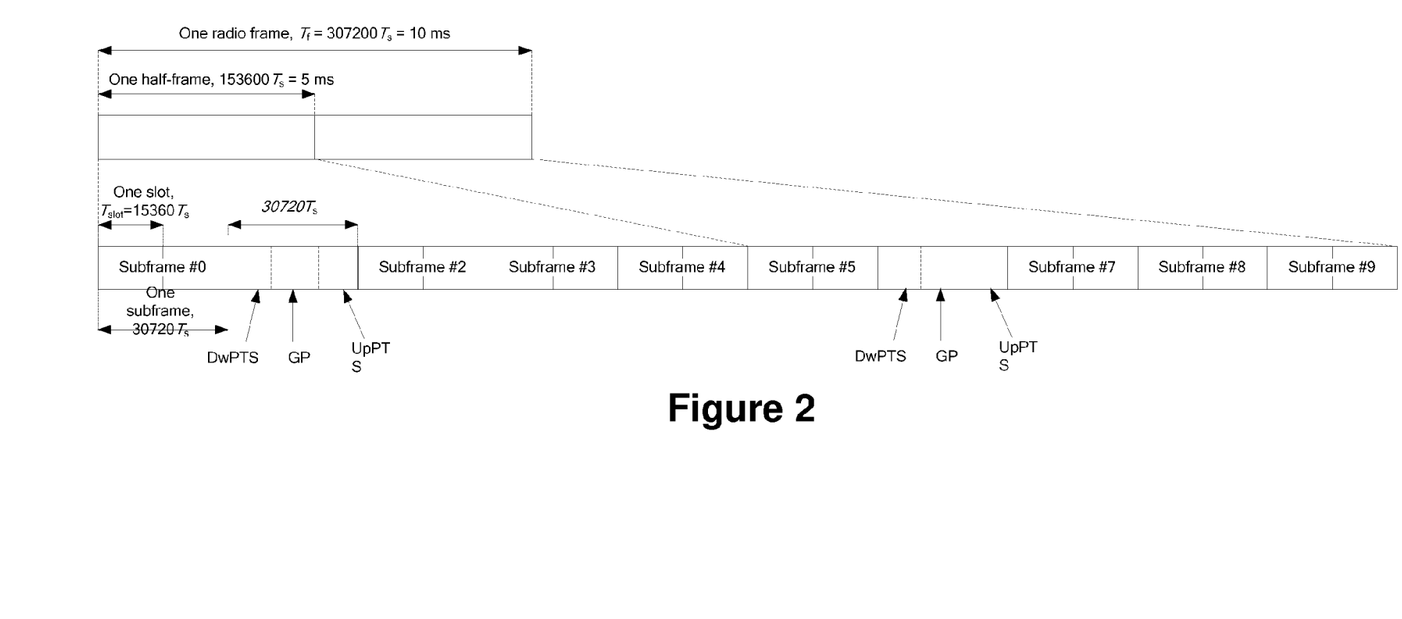
FIG. 2 is a LTE type 2 frame structure.

Frame structure type 2 is applicable to TDD. Each radio frame of length 10 ms consists of two half-frames of length 5 ms each. Each half-frame consists of five subframes of length 1 ms. The supported uplink-downlink configurations are listed in [2] where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. Each subframe is defined as two slots, of length 0.5 ms in each subframe. FIG. 2 is a scheme of the type 2 frame structure.

Figure 3:
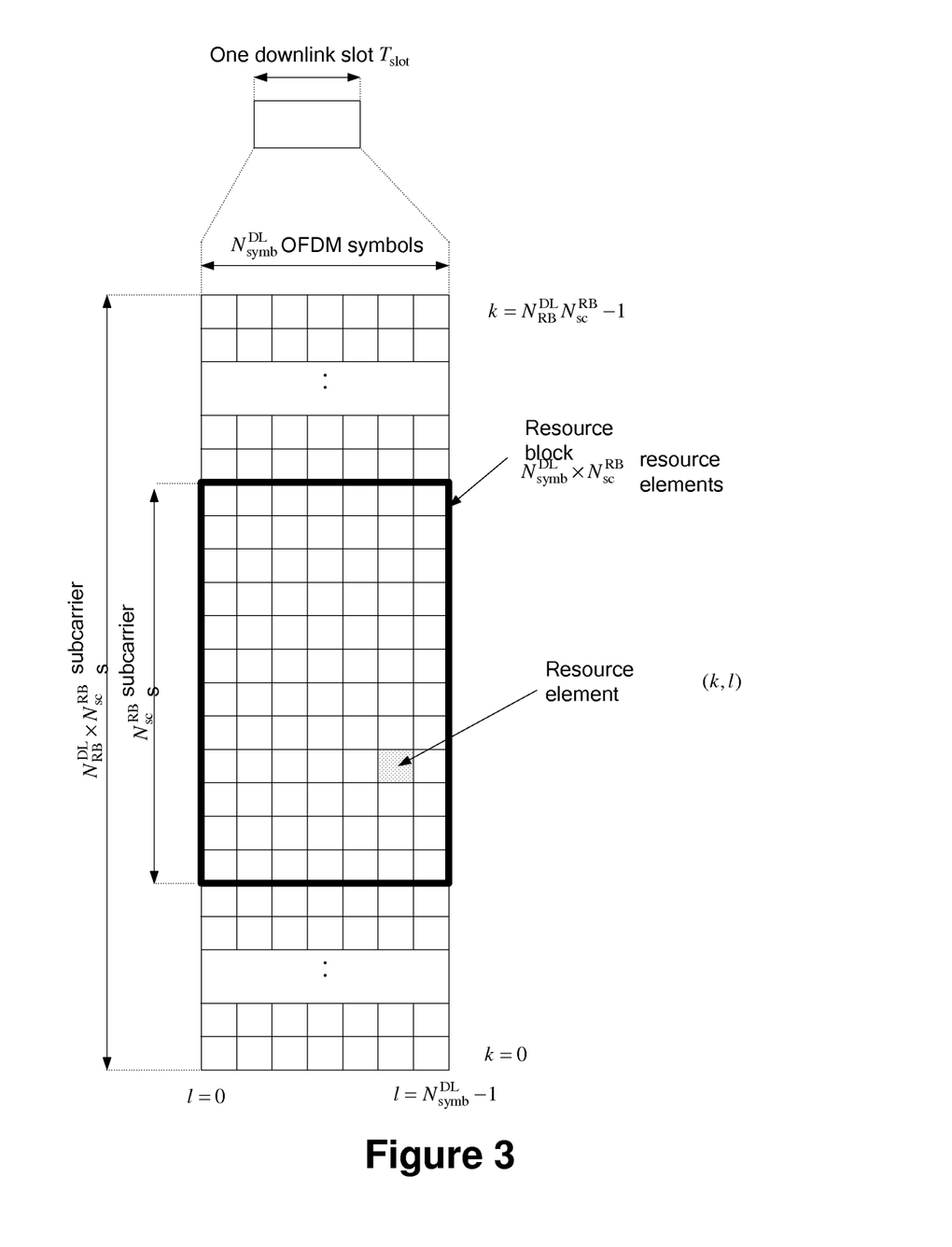
FIG. 3 is a LTE radio resources frame structure.

Every 0.5 ms slot is divided in 7 symbols, in the case of normal cyclic prefix length, or 6 symbols in the case of an extended cyclic prefix is used. The radio resources supported by the frame are divided in Resource Elements (REs) and Resource Blocks (RBs). An RE comprises one symbol and one subcarrier. An RB is the minimum radio resource that can be allocated to one user, and comprises a full 0.5 ms slot and 12 subcarriers in the case of normal cyclic prefix. FIG. 3 shows the LTE radio resources frame structure.

These frame structures can support both downlink (from the eNode B to the User Equipment) and uplink (from the User Equipment to the eNodeB) transmission, and for this purpose the frame can support a set of so called Physical Channels and Physical Signals.

In the downlink, the most important Physical Channels are:

Physical Downlink Shared Channel, PDSCH. The PDSCH supports the user data. The PDSCH is mapped to resource elements following the rules as described in 3 GPP TS 36.211 sections 6.3.5 and 6.4; in general, the mapping to resource elements on one antenna port not reserved for other purposes shall be in increasing order of first the index k (frequency index) over the assigned physical resource blocks and then the index I (time index), starting with the first slot in a subframe. This means that RB used for supporting PDSCH data will be filled from the first symbol in a slot, occupying all the subcarriers not used by other physical channels or signals, and then the next symbol in the time axis of the frame. The minimum resource assigned to the PDSCH is a RB, even though not all its subcarriers and symbols must be occupied.

Physical Downlink Control Channel, PDCCH. The PDCCH is the physical channel that carries the channel allocation and control information. It indicates which radio resources are used by the PDSCH in the downlink and in the same subframe, for User Equipment specific downlink transmissions, or in the uplink and four subframes later for User Equipment specific uplink transmissions. The PDCCH can make use of symbols from symbol 0, to symbols 0 & 1, to symbols 0,1 & 2, for frequency bandwidths greater than 1.8 MHz, as indicated by the Control Format Indicator (CFI) value, or from symbols 0,1 to symbols 0,1,2,3, as indicated by the CFI value plus 1, in the first slot of every subframe.

Physical Broadcast Channel, PBCH. The PBCH carries the Broadcast Channel, which is used to carry cell-specific information. The PBCH occupies 72 subcarriers in the center of the channel frequency band, and symbols 0, 1, 2 and 3 in the second slot of the first subframe of the frame.

Physical Control Format Indicator Channel, PCFICH. The physical control format indicator channel carries information about the number of OFDM symbols used for transmission of the PDCCHs in the same subframe. The PCFICH is always located in the symbol 0 of the first slot of every subframe. The set of OFDM symbols possible to use for PDCCH in a subframe is 1, 2 or 3 for frequency bandwidths greater than 1.8 MHz, or 2, 3 or 4 symbols for a frequency bandwidth below or equal to 1.8 MHz. The PCFICH transports the Control Format Indicator (CFI) [3]. The CFI takes values of 1, 2 or 3. For system bandwidths greater than 1.8 MHz, the CFI value indicates the number of symbols dedicated to the PDCCH, and for system bandwidths below or equal to 1.8 MHz, the number of symbols dedicated to the PDCCH is the CFI value plus 1.

Every CFI value is encoded into 32 bits. The PCFICH can support these 32 bits because it makes use of 4 Resource Element Groups (a Resource Element Group includes four Resource Elements), with a total of 16 QPSK-modulated subcarriers.

Figure 4:
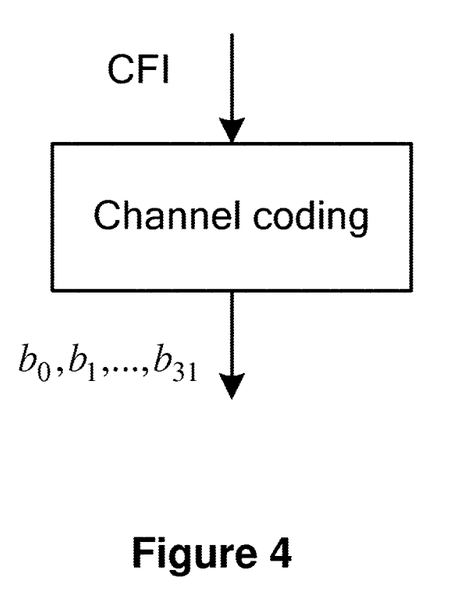
FIG. 4 shows the coding flow for CFI.

The coding flow is shown in FIG. 4.

The control format indicator is coded according to the next table, as specified in 3 GPP TS 36.211 [4].

TABLE 1

CFI code words.

| CFI | CFI code word <$b_0, b_1, \ldots, b_{31}$> |
|---|---|
| 1 | <0,1,1,0,1,1,0,1,1,0,1,1,0,1,1,0,1,1,0,1,1,0,1,1,0,1,1,0,1,1,0,1> |
| 2 | <1,0,1,1,0,1,1,0,1,1,0,1,1,0,1,1,0,1,1,0,1,1,0,1,1,0,1,1,0,1,1,0> |
| 3 | <1,1,0,1,1,0,1,1,0,1,1,0,1,1,0,1,1,0,1,1,0,1,1,0,1,1,0,1,1,0,1,1> |
| 4 (Reserved) | <0,0,0,0,0,0,0,0,0,0,0,0,0,0,0,0,0,0,0,0,0,0,0,0,0,0,0,0,0,0,0,0> |

Physical Hybrid ARQ Indicator Channel, PHICH. The PHICH is the physical channel that carries the Hybrid ARQ (Automatic Request) Indicator (HI). The HI contains acknowledgment / negative acknowledgment (ACK/NACK) feedback from the user equipment. The PHICH is mapped to the symbol 0 of the first slot of every subframe [5].

Multiple PHICHs mapped to the same set of resource elements constitute a PHICH group, where PHICHs within the same PHICH group are separated through different orthogonal sequences. A PHICH resource is identified by the index pair ($n_{PHICH}^{seq}$, $n_{PHICH}^{seq}$), where $n_{PHICH}^{group}$ is the PHICH group number and $n_{PHICH}^{seq}$ is the orthogonal sequence index within the group.

For frame structure type 1 (FDD), the number of PHICH groups $N_{PHICH}^{group}$ is constant in all subframes and given by $$-N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

where $N_g \in \{1/6, 1/2, 1, 2\}$ is provided by higher layers. The index $n_{PHICH}^{group}$ ranges from 0 to $N_{PHICH}^{group} - 1$.

For frame structure type 2 (TDD), the number of PHICH groups may vary between downlink subframes and is given by $m_i \cdot N_{PHICH}^{group}$ where $m_i$ can be 0, 1 or 2, and $N_{PHICH}^{group}$ by the expression above. The index $n_{PHICH}^{group}$ in a downlink subframe with non-zero PHICH resources ranges from 0 to $m_i \cdot N_{PHICH}^{group} - 1$.

Every PHICH transports the HARQ indicator (HI) [6], The HI is coded according to the next table, where for a positive acknowledgement is represented by means of HI =1 and for a negative acknowledgement HI=0. The HI is thus coded with a coding rate of 1/3.

TABLE 2

HI code words

| HI | HI code word <$b_0, b_1, b_2$> |
|---|---|
| 0 | <0,0,0> |
| 1 | <1,1,1> |

In the downlink, the most important Physical Signals are:
Cell Specific Reference Signal. This signal is transmitted in symbols 0 and 4 of every slot of every subframe.
Primary Synchronization Signal (PSS). This signal is transmitted in symbol 6 of the first slot of the first subframe of the frame.
Secondary Synchronization Signal (SSS). This signal is transmitted in symbol 5 of the first slot of the first subframe of the frame.

From this analysis it can be deduced that some symbols in the downlink frame will be always active, meaning active that some of their subcarriers will be used for information transmission. The symbols that will be always active are:
Symbol 0. It will always support the Cell Specific Reference Signal. It can also support the PCFICH (slot 0 of every subframe), the PHICH (slot 0 of every subframe), the PDCCH (slot 0 of those subframes that are transmitting data in the PDSCH), the PDSCH and PBCH.
Symbol 4. It will always support the Cell Specific Reference Signal. It can also support the PDSCH.

And it can also be deduced that some symbols in the downlink frame can be in some situation completely inactive or blank, meaning inactive or blank that none of their subcarriers are generated and modulated to transport information, and thus there is no transmission of any kind.

The symbols that in some situations can be inactive are symbols 1, 2, 3, 5, 6 of both slot 0 and slot 1 of every subframe. For example, the conditions in which some symbols in the downlink frame can be blank, in the case of frequency bandwidths greater than 1.8 MHz and one or two antenna ports, are summarized in the next table.

TABLE 3

Conditions in which downlink symbols can be blank

| | SUBFRAME 0 | | SUBFRAMES 1-9 | |
|---|---|---|---|---|
| SYMBOL | SLOT 0 | SLOT 1 | SLOT 0 | SLOT 1 |
| 1 | NO PDCCH NO PDSCH | PBCH always present | NO PDCCH NO PDSCH | NO PDSCH |
| 2 | NO PDCCH NO PDSCH | PBCH always present | NO PDCCH NO PDSCH | NO PDSCH |
| 3 | NO PDCCH NO PDSCH | PBCH always present | NO PDCCH NO PDSCH | NO PDSCH |
| 5 | SSS always present | NO PDSCH | NO PDSCH | NO PDSCH |
| 6 | PSS always present | NO PDSCH | NO PDSCH | NO PDSCH |

Regarding the uplink, the frame can support the following Physical Channels:
Physical Uplink Shared Channel, PUSCH. The PUSCH transports user-specific data and makes use of Resource Blocks as the minimum assignment unit.
Physical Uplink Control Channel, PUCCH. The PUCCH carries uplink control information. Simultaneous transmission of PUCCH and PUSCH from the same UE is supported if enabled by higher layers. The PUCCH is transmitted in both slot 0 and slot 1 of those subframes that support PUSCH RB.
Physical Random Access Channel, PRACH, is the physical channel that initiates the random access procedure between the User Equipment and the eNodeB. It occupies six contiguous RBs allocated anywhere across the channel bandwidth, in any of the 10 subframes of the frame.

The uplink can also support Physical Signals, in this case the Reference Signal. There are two types of Reference Signals: the demodulation reference signal, which is used for the demodulation of the PUSCH or the PUCCH, and Sounding Reference Signals, which are used by the eNodeB to estimate the uplink channel characteristics. The demodulation Reference Signal is transmitted in the same RBs than the PUSCH or the PUCCH.

From this analysis it can be deduced that there are not specific symbols in the uplink frame that will be used or unused, as the radio resource assignment performed by the eNodeB is done in a per-RB basis. However, depending on the radio resources requested by the User Equipments in the uplink, it is possible that some symbols in the uplink are inactive, meaning inactive that none of their carriers are modulated to transport information. Due to the fact that the radio resource assignment is done by the eNodeB and granted to the User Equipment in the downlink frame, the eNodeB knows in advance which radio resources will be used in the uplink, and thus can know in advance if some uplink Resource Blocks will be inactive.

On the other hand, there is a great activity in 3 GPP to develop techniques to reduce the interference between different eNodeBs. These techniques are known as Inter-Cell Interference Coordination (ICIC) techniques or Enhanced Inter-Cell Interference Coordination (eICIC), as they are described in [7].

Inter-cell interference coordination has the task to manage radio resources such that inter-cell interference is kept under control. ICIC mechanism includes a frequency domain component and time domain component. ICIC is inherently a multi-cell RRM function that needs to take into account information (e.g. the resource usage status and traffic load situation) from multiple cells.

The frequency domain ICIC manages radio resource, notably the radio resource blocks, such that multiple cells coordinate use of frequency domain resources.

For the time domain ICIC, subframe utilization across different cells are coordinated in time through backhaul signaling of so called Almost Blank Subframe (ABS) patterns. This means that the necessary information for ICIC is supported by the backhaul connection of the eNodeBs and the X2 interface between them. 3 GPP 36.423 [8] describes the X2 application protocol (X2AP), and [9] describes specific adaptations to report ABS patterns on the X2 interface.

Some related patents in this field are patent application US-A1-2012113844 that discloses a wireless communication terminal including a transceiver coupled to a processor configured to determine that a subset of a plurality of REs must be excluded from demodulation, the plurality of resource elements (REs) received in a signal from a first base station, to estimate a hypothetical block error rate (BLER) based on the signal received from the first base station by excluding the subset of the plurality of Res, and to estimate channel state information based on the hypothetical block error rate (BLER).

Patent application US-A1-2013230013 providing a method and apparatus for transmitting a control channel in a wireless communication system that supports multi-cell cooperative communication. The method performing a downlink transmission, by a base station, includes the steps of mapping at least one of a downlink control channel and a downlink data channel to a downlink subframe including a control region, a data region and a null region and transmitting at least one of the downlink control channel and the downlink data channel mapped to the downlink subframe to a user equipment, wherein the null region corresponds to a portion or all of a control region of a downlink subframe of a neighboring base station and wherein information for determining a position of the null region is provided to the user equipment.

Patent application US-A1-2012113844 providing an apparatus for selecting at least one element of a radio resource. The resource comprises a plurality of elements with a subset of said elements comprising reference information for one user equipment. The selecting means being configured to select the element other than from said subset.

The Almost Blank Subframes in an aggressor cell are used to protect resources in subframes in the victim cell receiving strong inter-cell interference. Almost blank subframes are specified in 3 GPP as subframes with reduced transmit power (including no transmission) on some physical channels and/or reduced activity. The eNB ensures backwards compatibility towards UEs by transmitting necessary control channels and physical signals as well as System Information. Patterns based on ABS subframes are signaled to the UE to restrict the UE measurement to specific subframes, called measurement resource restrictions. These patterns are quasi-static, because they do not change subframe by subframe. ICIC mechanisms are located in the eNodeB.

Problems with existing solutions:

There are two main areas where the current solutions for interference and power consumption reduction can be improved:

Limitations of the current solutions for interference reduction:

When neighbor eNodeBs share the same frequency band they must compete for the usage of the radio resources. This means that when a given eNodeB schedules a radio resource (a set of RE's within a set of RB's), both in the downlink and the uplink direction, to a particular User Equipment, a neighbor eNodeB can schedule the same radio resources to another User Equipment. This situation is particularly severe for those User Equipment that are located in the coverage boundary area between to eNodeBs, and for the dense deployments of eNodeBs that are common in urban areas. The current LTE frame structure and the current specification of the supported Physical Channels and Physical Signals does not include any information about the used or unused slots of a eNode B in the downlink or uplink subframes, that could be used by another eNodeB to schedule its radio resources so that they do not collide with the radio resources used by the previous eNodeB.

The solution proposed in 3 GPP for the inter-cell interference coordination (ICIC) is the use of Almost Blank Subframe patterns. In this case, an eNodeB reserves some subframes in the frame for no transmission of data, in order to reduce the potential interference with other eNodeBs. The limitations of this solution are:

In the particular case that the eNodeB is an HeNodeB (HeNB), in the current 3 GPP LTE standard the HeNB does not support an X2 interface. In this way, the HeNB cannot generate an Almost Blank Subframe pattern, or cannot report to a neighbor eNB or HeNB its radio Resource Block expected assignment in order to allow them to generate an Almost Blank Subframe pattern that would reduce the interference on the said HeNB.

The Almost Blank Subframe pattern emitted by an eNodeB is basically static, in the sense that the subframes that are left almost blank are repeated in every frame. This makes it impossible to adjust the almost blank subframes at every frame. This means that it is not possible to announce in every subframe if that particular subframe, or the next subframes, are almost blank, even less to announce which of the slots of the subframe are almost blank.

The Almost Blank Subframe procedure can only report those subframes that are almost blank, but not those slots that are blank.

In the case of future releases of 3 GPP LTE that could support an X2 interface between an HeNB and a eNodeB, or between HeNB's, the Almost Blank Subframe pattern procedure would also suffer from the variable delay introduced by the access network (for example the xDSL router and the DSLAM) and the HeNB Access Gateway, which would prevent any frequent update of the radio Resource Block expected assignment.

The Almost Blank Subframe procedure can only report which subframes are periodically almost blank in the downlink, but cannot report which subframes in the uplink are almost blank. In this way, an eNodeB or an HeNB cannot schedule radio Resource Blocks in the uplink taking into account the usage in another eNodeBs or HeNB's.

On the other hand, when an operational power amplifier is not fed with any input signal, it will generate a noise output, whose spectrum and power will depend on the power amplifier technology and the noise at its input. This output noise will be transmitted by the eNodeB and will interfere with the emissions of other eNodeBs, reducing the overall capacity of a mobile communications network. The current eNodeBs do not switch off their power amplifier in a per-symbol basis, as the eNode cannot know when a symbol is not used.

Limitations of the current implementation in the field of energy optimization:

In the downlink direction of transmission, some frame symbols will be used and others will not, but the power amplifier in the eNode cannot know in advance if some of the symbols are not used. Therefore, the power amplifier and its driver sections must always be on, regardless the fact that in some symbols there are no subcarriers to be transmitted. When a power amplifier is in operation, a fraction of its power is delivered to the output signal and another part is dissipated as heat. When a power amplifier is fed with no input signal to amplify, it will still consume some power. This means that the power amplifier will be unnecessarily consuming energy during those symbols or periods of time when no subcarriers must be transmitted.

Another problem of the current solutions is that the User Equipment cannot know in advance if some downlink symbols transmitted from the eNodeB are actually used or not. This makes it necessary for the User Equipment to keep its input Low Noise Amplifier (LNA) in an always-on status, thus draining battery power and reducing the User Equipment time of operation.

SUMMARY OF THE INVENTION

It is necessary to offer an alternative to the state of the art which covers the gaps found therein, particularly those related to the above mentioned limitations that known proposals have.

To that end, the present invention relates, in a first aspect, to a method for radio resources usage reporting in a LTE network, comprising a LTE cellular base station reporting radio resources usage information regarding its resource assignment in a current LTE frame emitted or to be emitted thereby.

On contrary to known proposals, the method of the first aspect of the invention comprises performing said radio resources usage reporting regarding slot usage for at least the slots of the downlink subframes of the current LTE frame.

Other embodiments of the method of the first aspect of the invention are described according to appended claims 2 to 18 and in a subsequent section regarding the detailed description of some embodiments.

The method of the first aspect of the invention proposes, for several embodiments, to report in the PHICH information about which slots of the LTE frame are unused. The requirements for an efficient slot usage report are two; the report must be done in every subframe, because the eNodeB scheduler schedules radio resources for every subframe, and the report must be done in the first symbol of the subframe, in order to give time to the schedulers of other eNodeBs to schedule its own radio resource usage taking into account the reporting eNodeB unused slots, and in order to give time to switch off the eNodeB power amplifier or the User Equipment LNA. A condition for a neighbor eNodeB to schedule its own resources taking into account the slot usage reported in the PHICH is that the eNodeBs are time synchronized, something that is already foreseen for the implementation of the Almost Blank Subframe techniques in 3 GPP Release 10.

The PHICH fulfills these requirements, because it is transmitted in every subframe, in the symbol 0 of the first slot, and thus can convey information about slot usage of that same downlink subframe or some subsequent subframes, or about subframe usage of the uplink frame four subframes later.

The PCFICH currently supports the CFI field, which can take for different values, 1, 2, 3 or 4. In low data traffic scenarios, the CFI value will be one, as there will be little need to support many PDCCH, which control the User Equipment access to the PDSCH.

This invention expands the PHICH definition, making it possible not only to transport the HI value, but also to transport information about the slots unused in the same downlink subframe, or some subsequent subframes in the same frame, or in the corresponding uplink subframe to be transmitted four subframes later. For this purpose, the PHICH will transport an extra PHICH group which will only contain two PHICH processes, separated by standard orthogonal sequences, one for reporting the slot occupation in the downlink, and the other the subframe occupation in the uplink. These PHICH processes will transport a Slot Indicator (SI), similar to the HI but using a different coding. SI coding will be also ⅓ but different from the current coding values used by the HI, therefore making it possible for a User Equipment or an eNodeB to detect that the PHICH group contents is the SI and not the HI.

For an embodiment, the proposed procedure is as follows. When the CFI in the PCFICH is 1, a User Equipment or another eNodeB can consider that the traffic is low and that the PHICH is reporting that some slots in the frame are unused. The User Equipment or the eNodeB check for the presence in the PCHICH of a PCHICH group with two orthogonal PCHICH's which transport the Slot Indicator, that can be distinguished from the HI thanks to its different coding.

This implementation ensures backward compatibility for legacy User Equipment, because a legacy User Equipment will not check for a SI in the PHICH when the CFI in the PCFICH is equal to 1, but otherwise will be able to decode the PCFICH and the PHICH using the standard procedures.

A second aspect of the invention refers to a use of the method of the first aspect for interference reduction.

A third aspect of the invention refers to a use of the method of the first aspect for energy optimization.

BRIEF DESCRIPTION OF THE DRAWINGS

The previous and other advantages and features will be more fully understood from the following detailed description of several embodiments, which must be considered in a non-limiting manner, and which will be more fully understood with reference to the attached drawings described in the above Prior State of the Art section, in which.

DETAILED DESCRIPTION OF SEVERAL EMBODIMENTS

The present invention proposes to report in the PHICH information about which slots of the LTE frame are unused, blank or almost blank in the 3 GPP terminology. The requirements for an efficient slot usage report are two; the report must be done in every subframe, because the eNodeB scheduler schedules radio resources for every subframe, and the report must be done in the first symbol of the subframe, in order to give time to the scheduler of other eNodeBs to schedule its own radio resource usage taking into account the reporting eNodeB unused slots, and in order to give time to switch off the eNodeB power amplifier or the User Equipment (UE) Low Noise Amplifier.

The PHICH fulfills these requirements, because it is transmitted in every subframe, in the symbol 0 of the first slot, and thus can convey information about slot usage of that same downlink subframe, or slot usage in some subsequent downlink subframe, or about slot usage of the uplink subframe four subframes later.

This invention expands the PHICH definition, making it possible not only to transport the HARQ Indicator (HI) value, but also to transport information about the slots unused in the same downlink subframe, or slot usage in some subsequent downlink subframe, or in the corresponding uplink subframe to be transmitted four subframes later.

For this purpose, the PHICH transports an extra PHICH group, or Slot Indicator PCHICH group, which contains two Slot Indicator PHICH processes, separated by standard orthogonal sequences, one Slot Indicator PHICH process for reporting the slot occupation in the downlink (Downlink Slot Indicator PHICH), and the other the slot occupation in the uplink (Uplink Slot Indicator PHICH). The standard orthogonal sequences can be any one of the 8 available for normal cyclic prefix frames, or the 4 available for extended cyclic prefix frames, as reported in [10]. For frame structure type 1 (FDD), the number of possible PCHICH groups is constant in all subframes and given by $$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

where $N_g \in \{1/6, 1/2, 1, 2\}$ is provided by higher layers. For example, for a channel bandwidth of 10 MHz, the number of groups can be between 1, 3, 6 or 12. This means that the LTE higher layers must report $Ng \geq 1/2$, and thus $N_{PHICH}^{group} \geq 3$, thus ensuring that there is room for the extra Slot Indicator PCHICH group.

For frame structure type 2 (TDD), the number of PHICH groups may vary between downlink subframes and is given by $m_i \cdot N_{PHICH}^{group}$ where $m_i$ can be 0, 1 or 2, and $N_{PHICH}^{group}$ by the expression above. In this case, the LTE higher layers must also report an $N_g$ value that ensures that the extra Slot Indicator PCHICH group can be transmitted in the PHICH.

Every Slot Indicator PHICH process in the Slot Indicator PHICH group transports a Slot Indicator (SI), similar to the HARQ Indicator (HI) but using a different coding. The SI coding is ⅓ but different to the current coding values used by the HI, therefore making it possible for a User Equipment or an eNodeB to detect that the PHICH group contents is the SI and not the HI.

The SI block coding could be done as follows, but this invention does not preclude any other 3 bit block coding, provided it is not the same used by the HI coding:

TABLE 4

Slot Indicator (SI) code words

| SI | SI code word $<b_0, b_1, b_2>$ |
|---|---|
| 0 | <1,0,1> |
| 1 | <0,1,0> |

In the case of the Downlink Slot Indicator PHICH, SI=0 means that the first slot of the subframe is unused, blank or almost blank, and SI=1 means that the second slot of the subframe is unused, blank or almost blank. It is not necessary to report that both slots of the subframe are unused, blank or almost blank, because this can be detected by the UE or an eNodeB, because when there is no user data to be transmitted in the downlink there is no PDSCH, and then there is no PDCCH and no PCFICH.

In the downlink, a slot is considered blank when no subcarriers in the symbols 1, 2, 3, 5 and 6 are transmitted, and it is considered almost blank when no PDSCH carriers are transmitted in symbols 1, 2, 3, 5 and 6.

In the uplink, it is not possible to deduce which symbols in the subframe are blank, almost blank or used, due to the modulation procedure used in the uplink (Single Carrier Frequency Division Multiple Access, SC-FDMA). In the uplink, a subframe will be considered to be almost blank or used. An almost blank subframe will be a subframe where the eNode or the HeNB does not schedule any user uplink transmission, supported by the Physical Uplink Shared Channel (PUSCH), and otherwise the subframe will be considered to be used.

In the case of the Uplink Slot Indicator PHICH, SI=0 means that the corresponding uplink subframe is almost blank, and SI=1 means that the subframe is used. The corresponding uplink subframe is the one that will be transmitted in the uplink four subframes later than the downlink subframe that supports the reporting Slot Indicator PHICH group.

Regarding the radio resources assignment for the Slot Indicator PHICH group, it is stated in TS 36.211 [11] that the PHICH groups are mapped to PHICH mapping units, numbered by means of an m' parameter that runs from 0, for the first PHICH mapping unit (which corresponds to the first PHICH group) to a maximum value specified in [11] (which corresponds to the last PHICH group), which in the case of the FDD frame and standard cyclic prefix is equal to the number of PHICH groups. The PHICH mapping units are mapped into Resource Elements in an increasing order of the m' parameter. The Slot Indicator PHICH group will follow the other PHICH groups and thus will be transmitted in the last position. In this way, a User Equipment or an eNodeB will always know where to look for the Slot Indicator PHICH group. The process of assignment of Resource Elements to the Slot Indicator PHICH group follows the general rules described in [11], taking into account that it will be mapped to the last PHICH mapping unit.

As stated above, the PCFICH currently supports the CFI field, which can take four different values, 1, 2, 3 or 4. In low data traffic scenarios, the CFI value will be one, as there will be little need to support many PDCCH, which control the User Equipment access to the PDSCH.

When the CFI in the PCFICH is 1, a User Equipment or another eNodeB will consider that the traffic is low and that the PHICH can be reporting that some slots in the same subframe, or in some subsequent downlink subframe, are unused. The User Equipment or the eNodeB checks for the presence in the PCHICH of a PCHICH group with two orthogonal PCHICH's, the Slot Indicator PCHICH group, which transports the Slot Indicators, that can be distinguished from the HARQ Indicators thanks to its different coding and because it follows the standard PHICH groups and thus is transmitted in the last position.

When a listening eNodeB or a HeNB detects the downlink SI and the uplink SI, it can know in advance if some of the two slots in a subframe are used, almost blank or blank, and schedule its own downlink and uplink radio resources accordingly in order to reduce the interference with the original eNodeB or HeNB. The exact radio resource assignment procedure is out of the scope of this patent application.

In the downlink, a slot is considered blank when no subcarriers in the symbols 1, 2, 3, 5 and 6 are transmitted, and it is considered almost blank when no PDSCH carriers are transmitted in symbols 1, 2, 3, 5 and 6. A listening eNodeB or HeNB can tell if a slot is used, blank or almost blank, from the SI value, the subframe number, and the presence of the PCFICH, as it is summarized in the next table.

TABLE 5

Blank, almost blank or used slot status deduction based on SI value, subframe and PCFICH presence

| | SUBFRAME 0 | | | | SUBFRAMES 1-9 | | | |
|---|---|---|---|---|---|---|---|---|
| | SLOT 0 | | SLOT 1 | | SLOT 0 | | SLOT 1 | |
| Symbol | SI = 0 | SI = 1 | SI = 0 | SI = 1 | SI = 0 | SI = 1 | SI = 0 | SI = 1 |
| 1 | blank | If NO PCFICH then blank else used | If NO PCFICH then almost blank (only PBCH) else used | Almost blank (only PBCH) | blank | If NO PCFICH then blank else used | If NO PCFICH then blank else used | blank |
| 2 | blank | If NO PCFICH then blank else used | If NO PCFICH then almost blank (only PBCH) else used | Almost blank (only PBCH) | blank | If NO PCFICH then blank else used | If NO PCFICH then blank else used | blank |
| 3 | blank | If NO PCFICH then blank else used | If NO PCFICH then almost blank (only PBCH) else used | Almost blank (only PBCH) | blank | If NO PCFICH then blank else used | If NO PCFICH then blank else used | blank |
| 5 | Almost blank (only SSS) | If NO PCFICH then almost blank (only SSS) else used | If NO PCFICH then blank else used | Blank | blank | If NO PCFICH then blank else used | If NO PCFICH then blank else used | Blank |
| 6 | Almost blank (only PSS) | If NO PCFICH then almost blank (only PSS) else used | If NO PCFICH then blank else used | Blank | blank | If NO PCFICH then almost blank (only PSS) else used | If NO PCFICH then blank else used | Blank |

If all the symbols 1, 2, 3, 5 and 6 of a downlink slot are declared as blank by a listening eNodeB, HeNB or UE, based on Table 5, the subframe number, and the presence of the PCFICH, then the slot will be labeled as blank by the listening eNodeB, HeNB or UE.

If some of the symbols 1, 2, 3, 5 and 6 of a downlink slot are declared as blank and other as almost blank by a listening eNodeB, HeNB or UE, then the slot will be labeled as almost blank by the listening eNodeB, HeNB or UE.

If some of the symbols 1, 2, 3, 5 and 6 of a downlink slot are declared as used by a listening eNodeB, HeNB or UE, then the slot will be labeled as used by the listening eNodeB, HeNB or UE.

In this way, any listening eNodeB or HeNB, if time synchronized with the sending eNodeB or HeNB, can know in advance the slots in the downlink subframe that will be used, almost blank or blank, and schedule its downlink radio Resource Blocks accordingly. This invention includes the possibility that the slot occupation information is referred to the same subframe where the SI PHICH group is sent, or referred to any subsequent downlink subframe in the same frame, the latter done in order to give time to other eNodeBs to decode the SI PHICH group and schedule their own radio resources accordingly. The knowledge of the sending eNodeB or HeNB downlink slot usage is subframe by subframe, and slot by slot, and not relying on any blank or almost blank pattern that the listening eNodeB or HeNB must know in advance. On the other hand, the knowledge of the sending eNodeB or HeNB slot usage does not rely on any X2 signaling, but it is reported in the sending eNodeB or HeNB frame.

This implementation ensures backward compatibility for legacy User Equipment, because a legacy User Equipment will not check for a Slot Indicator PCHICH group and Slot Indicators in the PHICH when the CFI in the PCFICH is equal to 1, but otherwise will be able to decode the PCFICH and the PHICH using the standard procedures.

On the other hand, the transmitting eNodeB or HeNB can also make use of the Slot Indicator PCHICH group to make decisions about when the Power Amplifier of the eNodeB or HeNB can be switched off. An eNodeB or an HeNB can make use of the downlink SI value, the subframe number, and the presence of the PCFICH, to determine which symbols of a subframe are blank, as it is summarized in table 5. If all the symbols 1, 2, 3, 5 and 6 of a slot are declared as blank by the eNodeB or the HeNB, then the slot will be labeled as blank by the eNodeB or the HeNB, and the eNodeB or the HeNB can switch off its Power Amplifier section during the time periods corresponding to symbols 1, 2, 3, 5 and 6. This procedure is particularly useful during low traffic conditions in flat fading propagation environments, which are usual in indoor scenarios for HeNB's, because if the radio fading is flat there is no advantage in scheduling radio resources in the frequency domain, and thus the HeNB can group all the transmission in a few full occupied slots, leaving some other slots blank.

The receiving UE can also make use of the Slot Indicator PCHICH group to make decisions about when its Low Noise Amplifier can be switched off. The UE can make use of the downlink SI value, the subframe number, and the presence of the PCFICH, to determine which symbols of a subframe are blank, as it is summarized in table 5. If all the symbols 1, 2, 3, 5 and 6 of a slot are declared as blank by the UE, then the slot will be labeled as blank by the UE, and the UE can switch off its Low Noise Amplifier section during the time periods corresponding to symbols 1, 2, 3, 5 and 6, provided that the UE has not been instructed by the higher layers to make radio measurements during those time periods.

Advantages of the Invention:

The method of the invention can report in every downlink subframe which of its two downlink slots are blank, almost blank or used, or the slot usage in some subsequent downlink subframe. This makes it possible to the eNodeB or HeNB radio resource scheduler to dynamically decide when a slot or a subframe must be left blank or almost blank, subframe by subframe, and report it in the same LTE frame. In this way, any other listening eNodeB or HeNB can schedule its own downlink radio resources taking into account the reported slot usage of the reporting eNode or HeNB, reducing the interference between radio cells. This is opposed to the Almost Blank Subframe pattern procedure, which is basically static, in the sense that the subframes that are left almost blank are repeated in every frame, and this makes it impossible to adjust the almost blank subframes at every frame. This means that it is not possible to announce in every subframe if that particular subframe, or some subsequent downlink subframe in the same frame, is almost blank, even less to announce which of the slots of the subframe is almost blank.

On the other hand, the method of the invention can report in every downlink subframe if the corresponding uplink subframe, which will be scheduled for uplink transmission four subframes later, will be used or almost blank, making it possible for the radio resources scheduler of other eNodeB or HeNB to schedule its uplink radio resources accordingly. Currently, the Almost Blank Subframe procedure is only focused in the downlink reporting.

Another advantage of the invention is that the blank, almost blank or used subframe or slot reporting does not rely on the X2 interface, which is not currently present between HeNB's, an which cannot ensure a short enough delay between eNodeBs to ensure a subframe by subframe update of the subframe usage. The method of the invention reports the slot or subframe usage embedded within the LTE frame.

The invention makes it possible that the eNodeB or the HeNB switches off its Power Amplifier radio section when some downlink symbols of a subframe are reported as blank, thus reducing energy consumption and noise emissions. The invention makes it possible too to switch off the LNA of the UE, when the UE detects that some downlink symbols of a subframe are blank and no downlink measurement has been scheduled, in order to save battery power.

Another advantage of the invention is that it is backward compatible with UE's compliant with previous releases of 3 GPP, because a legacy User Equipment will not check for a Slot Indicator PCHICH group and Slot Indicators in the PHICH when the CFI in the PCFICH is equal to 1, but otherwise will be able to decode the PCFICH and the PHICH using the standard procedures.

A person skilled in the art could introduce changes and modifications in the embodiments described without departing from the scope of the invention as it is defined in the attached claims.

Acronyms and Abbreviations
ABS Almost Blank Subframe
CFI Control Format Indicator
DSLAM Digital Subscriber Line Access Multiplexer
HARQ Hybrid Automatic Repeat Request
HI HARQ Indicator
ICIC Inter-Cell Interference Coordination
LTE Long Term Evolution
PBCH Physical Broadcast Channel
PCFICH Physical Control Format Indicator Channel
PDCCH Physical Downlink Control Channel
PDSCH Physical Downlink Shared Channel
PHICH Physical Hybrid Indicator Channel
PUSCH Physical Uplink Shared Channel
SC-FDMA Single Carrier Frequency Division Multiple Access
SI Slot Indicator
UE User Equipment References:

[1] 3 GPP TS 36.211 Evolved Universal Terrestrial Radio Access (E-UTRA); Physical channels and modulation (Release 10). Section 4 Frame structure.

[2] 3 GPP TS 36.211 Evolved Universal Terrestrial Radio Access (E-UTRA); Physical channels and modulation (Release 10). Section 4.2 Frame structure type 2. Table 4.2-2: Uplink-downlink configurations.

[3] 3 GPP TS 36.212 Evolved Universal Terrestrial Radio Access (E-UTRA); Multiplexing and channel coding (Release 10). Section 5.3.4 Control format indicator.

[4] 3 GPP TS 36.212 Evolved Universal Terrestrial Radio Access (E-UTRA); Multiplexing and channel coding (Release 10). Section 5.3.4 Control format indicator. Table 5.3.4-1.

[5] 3 GPP TS 36.212 Evolved Universal Terrestrial Radio Access (E-UTRA); Multiplexing and channel coding (Release 10). Section 6.9.3 Mapping to resource elements.

[6] 3 GPP TS 36.212 Evolved Universal Terrestrial Radio Access (E-UTRA); Multiplexing and channel coding (Release 10). Section 5.3.5 HARQ indicator (HI).

[7] 3 GPP TS 36.300 V1 0.3.0 E-UTRAN Overall description; Stage 2 (Release 10). Section 16.1.5 Inter-cell Interference Coordination (ICIC).

[8] 3 GPP TS 36.423 V1 0.1.0 X2 application protocol (X2AP).

[9] 3 GPP TSG-RAN WG3 Meeting #71 doc. Number R3-110953 Taipei, Taiwan, 21 st—25th Feb., 2011. CHANGE REQUEST 36.423 CR 0427 "Enabling reporting of ABS resource status for eICIC purposes".

[10] 3 GPP TS 36.211 Evolved Universal Terrestrial Radio Access (E-UTRA); Physical channels and modulation (Release 10). Table 6.9.1-2: Orthogonal sequences for PHICH.

[11] 3 GPP TS 36.211 Evolved Universal Terrestrial Radio Access (E-UTRA); Physical channels and modulation (Release 10). Section 6.9.3 Mapping to resource elements.

The invention claimed is:

1. A method for radio resources usage reporting in a LTE network, the method comprising:
a LTE cellular base station reporting radio resources usage information regarding resource assignment of the LTE cellular base station in a current LTE frame emitted or to be emitted thereby, said radio resources usage reporting regarding slot usage being performed for at least slots of downlink subframes of the current LTE frame,
wherein said radio resources usage reporting is further performed for slots of uplink subframes of the current LTE frame indicating if an uplink subframe is almost blank or used, and by including usage information within at least one subframe of the current LTE frame itself,
wherein said usage information is at least included in a first slot of every subframe of the current LTE frame,
further comprising including said usage information in a PHICH of every subframe of the current LTE frame,
wherein said usage information is included in a Slot Indicator which uses a different coding than a coding used for a HARQ Indicator, and
wherein said Slot Indicator is a Slot Indicator PHICH group containing two slot indicator PHICH processes, separated by standard orthogonal sequences, one for slot occupation in a downlink and another for subframe occupation in an uplink.

2. The method of claim 1, wherein said slot usage reporting includes indicating if a downlink slot is unused, blank or almost blank.

3. The method of claim 1, wherein said resources usage reporting refers to the slots of the downlink subframe where said usage information is included and/or of at least one subsequent subframe of said current LTE frame and/or of other subsequent LTE frames.

4. The method of claim 1, comprising including said usage information in the first symbol of the first slot of every subframe of the current LTE frame.

5. The method of claim 1, wherein said Slot Indicator PHICH group is supported in a downlink group, and in that the Slot Indicator PHICH process regarding the subframe occupation in the uplink refers to one which will be transmitted four subframes later than said downlink subframe.

6. The method of claim 5, further comprising, a neighbor LTE cellular base station or a user equipment, upon reception of said LTE frame from the reporting LTE cellular base station, checking the value of the CFI field of the PCFICH, and in response to said value being 1, checking the PHICH for retrieving said usage information.

7. The method of claim 1, further comprising a neighbor LTE cellular base station scheduling its own radio resource usage based on and in response to reception of the reported resource usage of said reporting LTE cellular base station.

8. The method of claim 7, wherein said reporting and said neighbor LTE cellular base stations are time synchronized.

9. A method for radio resources usage reporting in a LTE network, the method comprising:
a LTE cellular base station reporting radio resources usage information regarding resource assignment of the LTE cellular base station in a current LTE frame emitted or to be emitted thereby, said radio resources usage reporting regarding slot usage being performed for at least slots of downlink subframes of the current LTE frame,
wherein said radio resources usage reporting is further performed for slots of uplink subframes of the current LTE frame indicating if an uplink subframe is almost blank or used, and by including usage information within at least one subframe of the current LTE frame itself,
wherein said usage information is at least included in a first slot of every subframe of the current LTE frame, and
further comprising the reporting LTE cellular base station, based on reported unused slots, switching off a power amplifier of the reporting LTE cellular base station in response to not having to transmit any signal, on a per symbol basis.

10. A method for radio resources usage reporting in a LTE network, the method comprising:
a LTE cellular base station reporting radio resources usage information regarding resource assignment of the LTE cellular base station in a current LTE frame emitted or to be emitted thereby, said radio resources usage reporting regarding slot usage being performed for at least slots of downlink subframes of the current LTE frame,
wherein said radio resources usage reporting is further performed for slots of uplink subframes of the current LTE frame indicating if an uplink subframe is almost blank or used, and by including usage information within at least one subframe of the current LTE frame itself,
wherein said usage information is at least included in a first slot of every subframe of the current LTE frame, and
further comprising a user equipment receiving said current LTE frame from the reporting LTE cellular base station, based on reported unused slots, switching off an input Low Noise Amplifier of the user equipment in response to not having to receive any signal, on a per symbol basis.

11. The method of claim 1, wherein each of said reporting and said neighbor LTE cellular base stations is one of a macro cellular base station, or eNB, and a femto cellular base station, or HeNB.

12. The method of claim 1, wherein said current LTE frame has a Type 1 or Type 2 radio frame structure.

13. Use of a method as per claim 1 for interference reduction.

14. Use of a method as per claim 1 for energy optimization.

* * * * *